(12) United States Patent
Jost

(10) Patent No.: US 11,938,878 B1
(45) Date of Patent: Mar. 26, 2024

(54) OCCUPANT RESTRAINT SYSTEM AND METHOD

(71) Applicant: Zoox, Inc., Foster City, CA (US)

(72) Inventor: Markus Jost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/359,357

(22) Filed: Jun. 25, 2021

(51) Int. Cl.
*B60R 21/01* (2006.01)
*B60R 21/015* (2006.01)
*B60R 22/48* (2006.01)

(52) U.S. Cl.
CPC ........ *B60R 21/01* (2013.01); *B60R 21/01538* (2014.10); *B60R 21/01544* (2014.10); *B60R 22/48* (2013.01); *B60R 2021/01034* (2013.01); *B60R 2021/01218* (2013.01); *B60R 2021/01225* (2013.01); *B60R 2021/01272* (2013.01)

(58) Field of Classification Search
CPC .............. B60R 21/01; B60R 21/01538; B60R 21/01544; B60R 22/48; B60R 2021/01034; B60R 2021/01218; B60R 2021/01225; B60R 2021/01272
See application file for complete search history.

(56) References Cited

U.S. PATENT DOCUMENTS

| | | | |
|---|---|---|---|
| 10,137,856 B1 | 11/2018 | Jimenez et al. | |
| 2001/0015547 A1* | 8/2001 | Breed | G01S 7/539 |
| | | | 280/735 |
| 2004/0060762 A1* | 4/2004 | Tobata | B60R 22/46 |
| | | | 701/45 |
| 2007/0007066 A1* | 1/2007 | Mertz | B60R 21/01512 |
| | | | 280/806 |
| 2015/0251618 A1* | 9/2015 | Ghannam | B60R 22/48 |
| | | | 340/457.1 |
| 2018/0170296 A1* | 6/2018 | Pline | B60R 21/01544 |
| 2018/0312136 A1* | 11/2018 | Morrow | H04Q 9/00 |
| 2018/0326944 A1* | 11/2018 | Cech | B60R 21/01512 |
| 2020/0023808 A1* | 1/2020 | Terai | D03D 15/283 |
| 2021/0394710 A1* | 12/2021 | Hu | B60W 40/09 |
| 2022/0227331 A1* | 7/2022 | Uszkur | B60R 22/48 |

FOREIGN PATENT DOCUMENTS

| | | | | |
|---|---|---|---|---|
| DE | 10142792 A1 * | 4/2003 | ....... | B60R 21/01538 |
| DE | 102006040244 B3 * | 8/2007 | ....... | B60R 21/01538 |
| DE | 102007048843 A1 * | 6/2009 | .......... | B64D 11/062 |
| DE | 102015208807 A1 * | 11/2016 | | |
| DE | 102016014867 A1 * | 6/2017 | | |
| JP | 2008068742 A * | 3/2008 | | |
| WO | WO-2019164825 A1 * | 8/2019 | ............ | B60K 28/04 |
| WO | WO-2021175517 A1 * | 9/2021 | ............ | B60R 22/48 |

* cited by examiner

*Primary Examiner* — Keith J Frisby
(74) *Attorney, Agent, or Firm* — EIP US LLP

(57) ABSTRACT

An occupant constraint system may include a belt marker on a seat belt in a passenger compartment of the vehicle for restraining a passenger during a collision. The occupant constraint system may include a camera system for producing marker position data that is indicative of a position of the marker, and a physical characteristic estimator that is uses the marker position data to produce a physical characteristic estimate of a physical characteristic estimate of the passenger. The occupant constraint system may include a passenger related system having a passenger function and the passenger related system may control the passenger function based at least in part on the physical characteristic estimate.

14 Claims, 9 Drawing Sheets

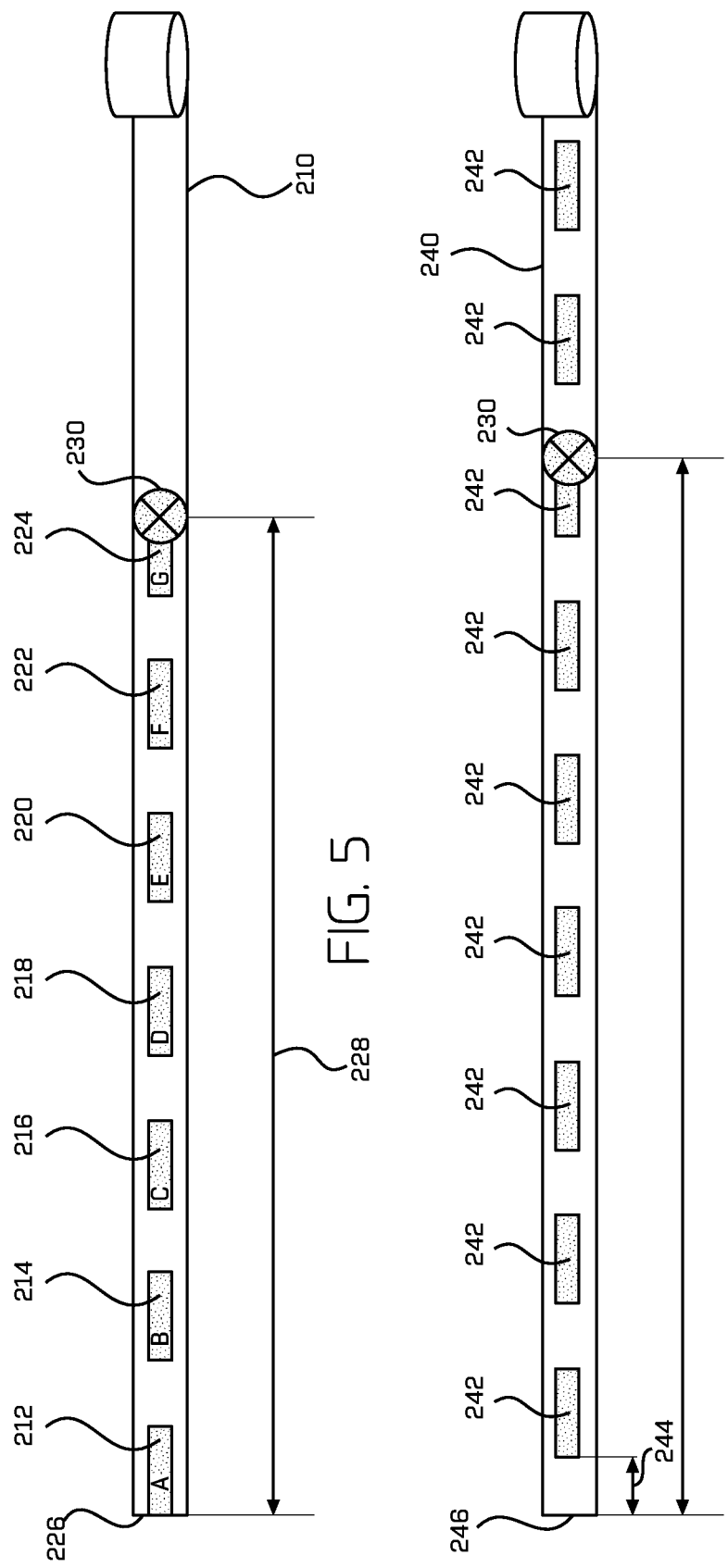

OCCUPANT RESTRAINT SYSTEM AND METHOD

BACKGROUND

Seatbelts are commonly used in vehicles to help prevent injury to passengers during accidents by keeping the passengers in their seats. By maintaining a passenger in their seat during a collision, the seatbelt can prevent the passenger from coming into harmful contact with other parts of the vehicle. The seatbelt can also keep the passenger in a position that allows the vehicle airbag system to provide the most effective protection of the passenger. The seatbelt can also help prevent the passenger from being ejected from the vehicle during an accident. Many jurisdictions require the use of seatbelts by passengers to reduce injury.

BRIEF DESCRIPTION OF DRAWINGS

The detailed description is described with reference to the accompanying figures. The use of the same reference numbers in different figures indicates similar or identical components or features.

FIG. 5 is a seat belt having a series of belt markers according to examples.

FIG. 6 is a seat belt having a series of belt markers according to another embodiment.

DETAILED DESCRIPTION

Figure 1:
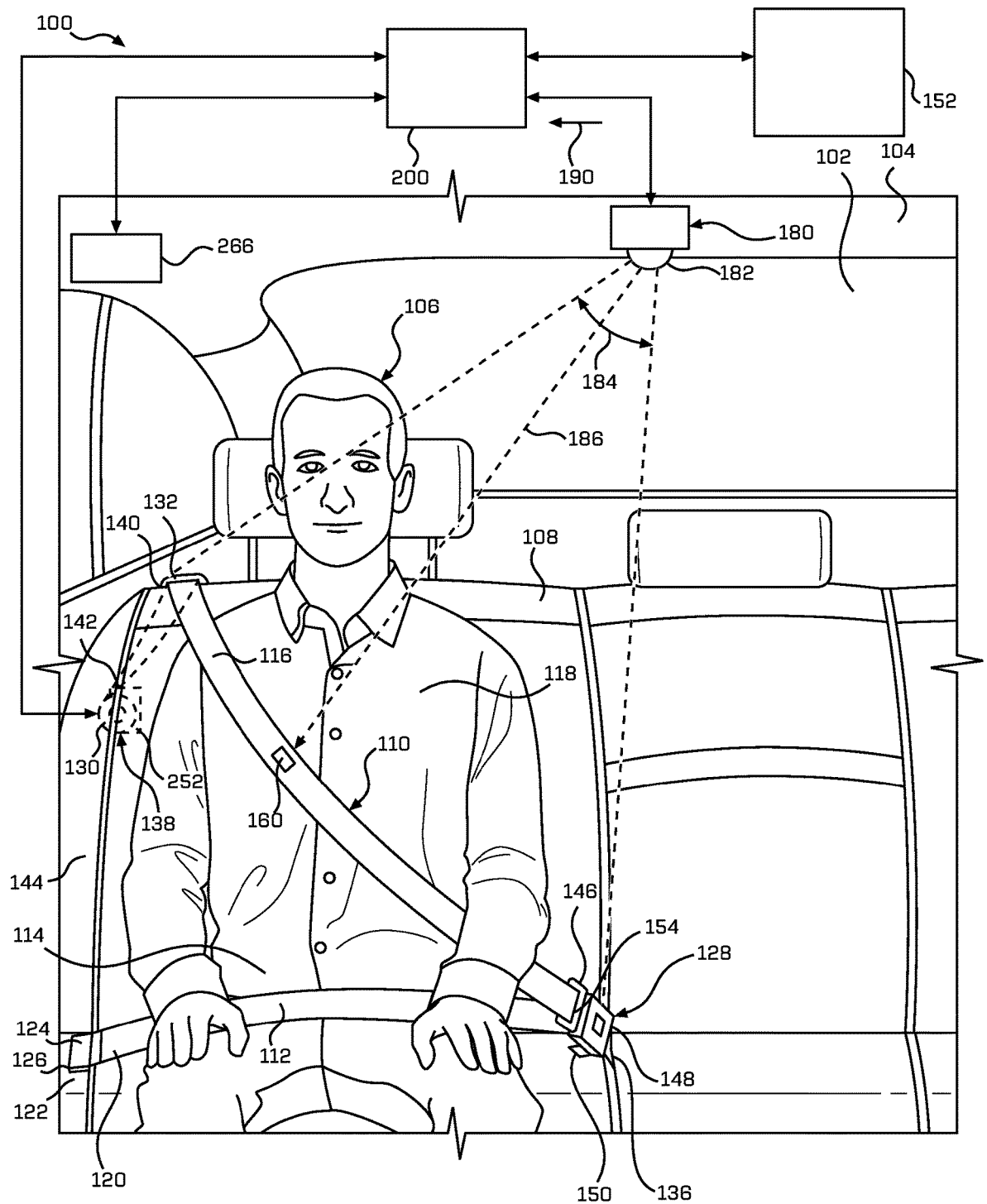
FIG. 1 is a perspective view of examples of an occupant constraint system used by a passenger in a passenger compartment of a vehicle.

The occupant constraint system and methods disclosed herein can be used in passenger carrying vehicles, including autonomous vehicles. As described in the present disclosure, the occupant constraint system described can involve estimating physical characteristic of vehicle passenger and controlling a passenger related system. The occupant constraint system and methods may improve the overall safety for passengers in the vehicle.

Some autonomous vehicles do not have provisions in the vehicle for a driver or other operator to control or manage the vehicle. While there are drivers in taxi's and ride share vehicles, who can monitor passenger usage of seatbelts, there are not humans in some autonomous vehicles to perform this function. In addition, autonomous vehicles can have multiple different people as passengers. These people can have a variety of different physical characteristics. Because of this, the physical characteristics of passengers using each seat in the vehicle can vary from one trip to another throughout the use of the vehicle. The occupant constraint system described herein is able to estimate a variety of passenger physical characteristics at each of the vehicle's seats to improve safety for the passengers.

In some examples, the occupant constraint system may estimate a physical characteristic of a passenger in a particular seat of the vehicle and may control or provide information to one or more system of the vehicle which can be used to make accommodations for those physical characteristics. The system controlled may be a safety system such as a load limiter which can limit a holding force of the seat belt and the system may control the holding force at which the belt of the occupant constraint system holds the passenger while the vehicle experiences a collision.

In some examples, the occupant constraint system can include a belt marker on the seat belt and the occupant constraint system can include a camera system having a camera with a field of view that includes a view of the belt marker. The camera system may produce a signal having marker position data that is indicative of the position of the belt marker in the field of view of the camera. The occupant constraint system can also include a physical characteristic estimator that is communicatively connected to the camera system to receive marker position data. The physical characteristic estimator can use the marker position data to produce a physical characteristic estimate of a physical characteristic of the passenger.

The position of the belt marker can indicate physical characteristics of the passenger. For example, if the belt marker is on the sash portion of the seat belt and is relatively higher up on the torso of the passenger, then this can indicate that the passenger is small since there will be less lap portion of the belt going across the waist of the passenger and the sash portion of the belt will move further up. Conversely, if the belt marker is relatively lower down on the torso of the passenger, then this can indicate that the passenger is large since there is more lap portion to go around the relatively larger waist of the passenger and the sash portion of the belt will move further down.

Figure 2:
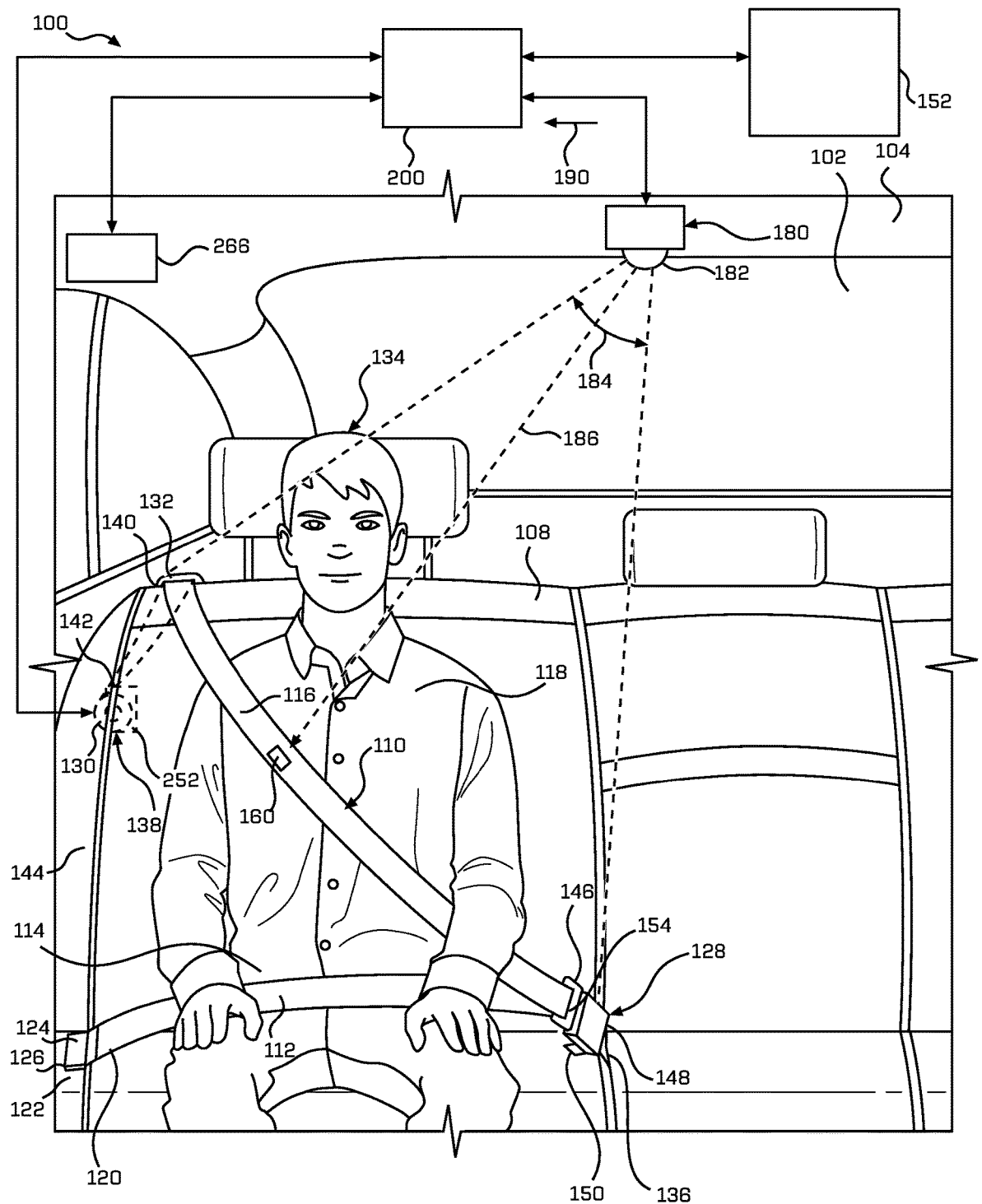
FIG. 2 is a perspective view of the occupant constraint system shown in FIG. 1 used by a smaller passenger in the passenger compartment of the vehicle.

FIG. 1 is a perspective view of an example occupant constraint system 100 in a passenger compartment 102 of a vehicle 104 with a passenger 106 buckled into a seat 108 of the vehicle. In some examples, the occupant constraint system 100 can include a seat belt 110 that has a lap portion 112 for crossing over and securing around the passenger's waist 114, and a sash portion 116 for crossing over and securing the passenger's torso 118. A first end 120 of the seat belt 110 may be connected to a vehicle chassis 122 using a fixed belt connector 124 at a first mounting position 126. The lap portion 112 extends from the first mounting position 126 to a buckle assembly 128. The sash portion 116 is the part of the seat belt 110 that extends from the buckle assembly 128 to a belt reel 130, either directly or through a shoulder ring 132, for passengers who are in the $5^{th}$ to $95^{th}$ percentile for size of people. People in the $5^{th}$ percentile can be the smallest people in the population by volume and/or mass, and people in the $95^{th}$ percentile can be among the largest people in the population by volume and/or mass. A person that is in the $50^{th}$ percentile can represent about 50% of the average population by size, e.g., volume and/or mass. FIG. 1 shows a passenger 106 that is approximately about in the $50^{th}$ percentile and FIG. 2 shows a passenger 134 that is approximately about in the $5^{th}$ percentile.

The buckle assembly 128 may be connected to the vehicle chassis 122 at a second mounting position 136. The belt reel 130 and shoulder ring 132 may be connected to the vehicle chassis 122 at a third mounting position 140 and fourth mounting position 138, respectively. The vehicle chassis 122 may include structural components of the vehicle 104 that are capable of holding the seat belt during a collision. The belt reel 130 may be connected to a second belt end 142 to wind and unwind a portion of the seat belt adjacent to the second belt end 142. The first and second mounting positions 126 and 136 can be located on opposite sides of the seat 108 with one or the other next to a door 144. The fixed belt connector 124 holds the first end 120 of the seat belt 110 to the vehicle 104 and typically does not include any adjustment mechanism to adjust the length of the seat belt 110 relative to the chassis 122.

The buckle assembly 128 can be buckled to secure the seat belt around the passenger 106/134 during use; and unbuckled to release the seat belt 110 from around the passenger 106/134. The buckle assembly 128 may include a belt portion 146 that is associated with the seat belt 110, and a vehicle portion 148 that is fixed to the vehicle chassis 122 at the second mounting position 136. The belt portion 146 may include a tongue and the vehicle portion 148 may include a receiver that engages the tongue when the buckle assembly 128 is buckled. When the buckled, the buckle assembly 128 secures the seat belt 110 to the chassis 122. In some embodiments, the buckle assembly 128 may include a buckle sensor 150 that indicates when the buckle assembly 128 is buckled or unbuckled. The buckle sensor 150 may be used in determining when to begin to determine the physical characteristics of the passenger 106/134 or when a passenger does not have their seat belt buckled. The buckle sensor 150 can be, or can be connected to, a vehicle system 152 that controls and/or senses other systems in the vehicle 104. The vehicle system 152 can be connected the occupant constraint system 100.

The belt portion 146 can have a slot 154 through which the seat belt 110 can slide so that the lengths of the lap portion 112 and sash portion 116 can be adjusted to fit the size of the passenger 106/134. When the passenger 106/134 sits in the seat 108 and buckles the seat belt 110, the passenger 106/134 pulls the belt portion 146 of the buckle assembly 128 across their body and the seat belt 110 slides through the slot 154 such that the lengths of the lap portion 112 and sash portion 116 adjust to fit the physical characteristics of the passenger 106/134.

Figure 3:
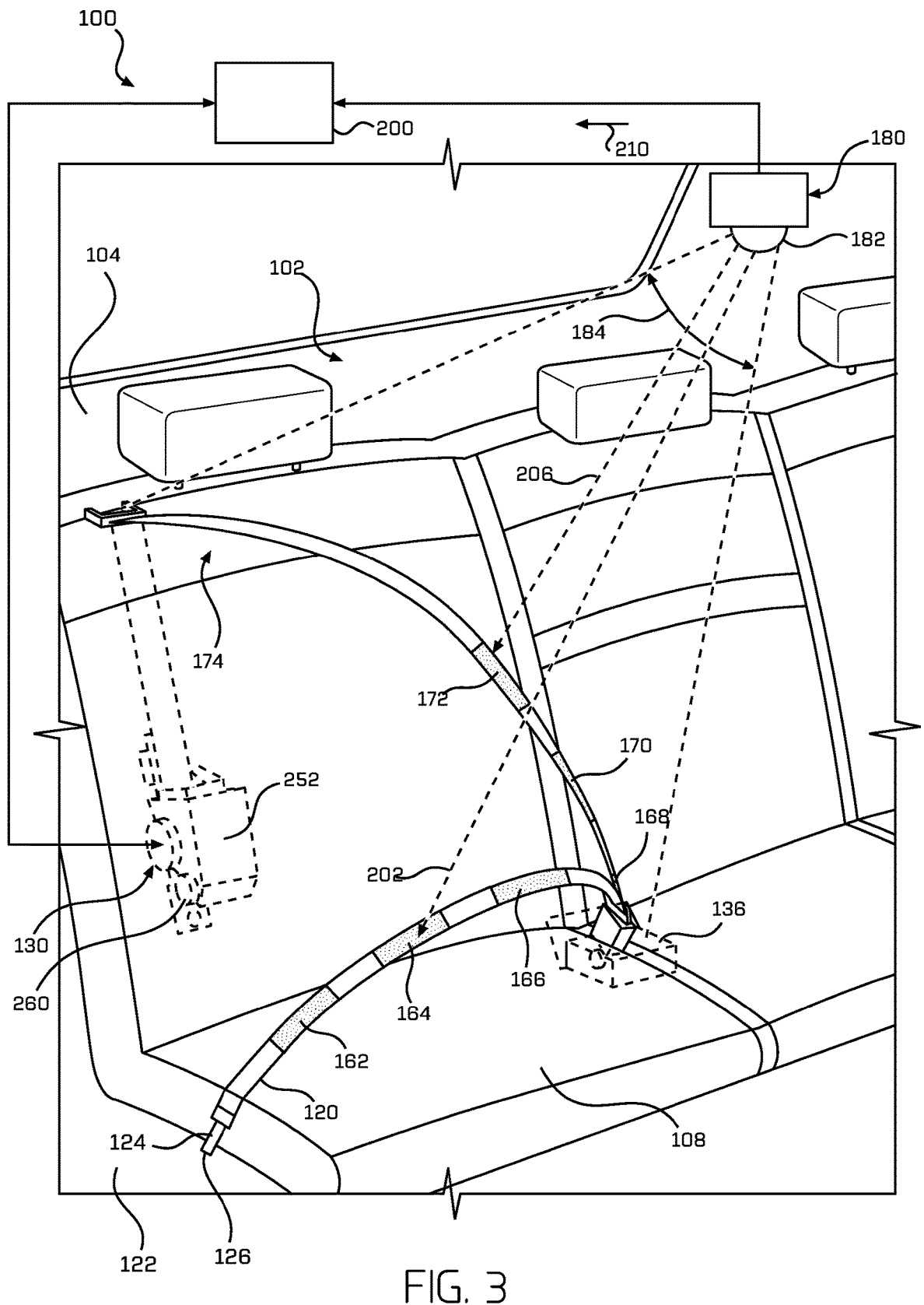
FIG. 3 is a perspective view of another embodiment of an occupant constraint system for use by passengers in a vehicle with belt markers at first positions.
Figure 4:
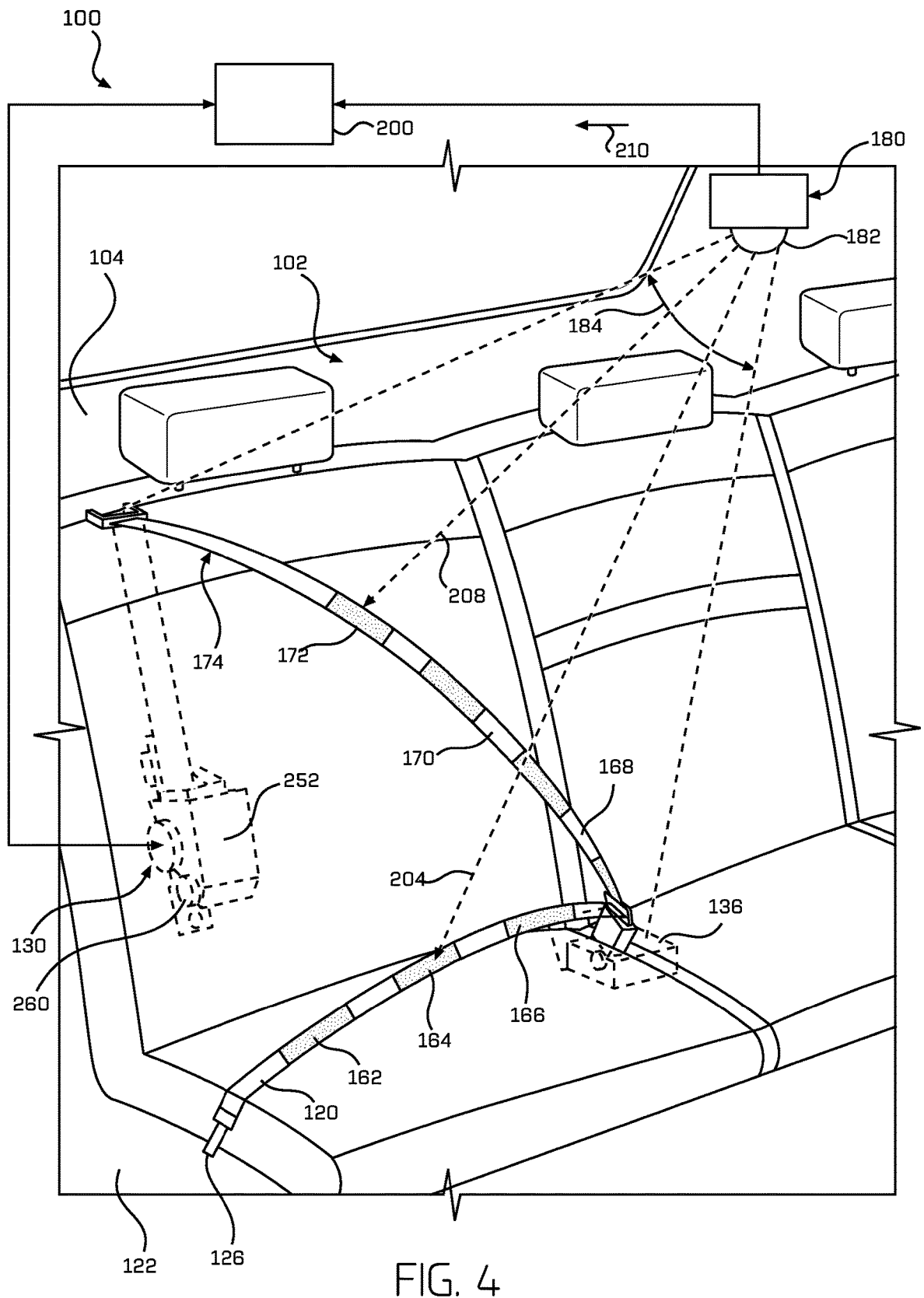
FIG. 4 is a perspective view of the occupant constraint system shown in FIG. 3 with the sea for use by passengers in a vehicle with the belt markers at different positions.

The occupant constraint system 100 may include one or more belt markers 160 on the seat belt 110. The belt marker 160 may be a single belt marker, as shown in FIGS. 1 and 2, or the belt marker may include two or more belt markers which may be in a series, such as belt markers 162, 164, 168, 170 and 172, as shown in FIGS. 3 and 4 on a seat belt 174. In one embodiment, there may be one belt marker 160 on the sash portion 116 of the seat belt 110. In another embodiment, there may be one belt marker on the sash portion and another belt marker on the lap portion 112 of the seat belt 110. In another embodiment, the occupant constraint system 100 may include a series of belt markers that start at or near one end of the seat belt, such as the first end 120 or second end 142 of the seat belt 110. In examples, the belt markers can each have a unique identifier, such as a letter, number, code, or other uniquely identifiable characteristic. The belt marker can be printed on the seat belt or affixed to the seat belt. The belt marker can be made to be optically recognized, such as by using color and/or shape, and the belt marker can be made to reflect light, such as visible, or non-visible infrared light. In examples, the marker or markers may be or include other technologies that can be used to determine position, including near field communication (NFC) chips. In examples, there can be multiple NFC chips on the seat belt, and each can have a unique identification. An NFC chip reader can be mounted in the vehicle and can be used to determine the location of the NFC chips.

The occupant constraint system 100 can include a camera system 180 that can be mounted in the passenger compartment 102 of the vehicle 104. The camera system 180 can include a camera 182 that has field of view 184 that includes at least a portion of the seat belt 110 that has at least one belt marker 160. In examples, the belt marker 160 can be a sash belt marker which can be located on the sash portion 116 of the seat belt 110. The sash belt marker 160 and the camera 182 can be positioned so that the sash belt marker 160 is in the field of view 184 of the camera when the passenger 106/134 is seated in the seat 108 and the seat belt 110 is buckled around the passenger 106/134. The camera 182 can have infrared capabilities to image the belt marker 160 when the belt marker 160 is infrared reflective. The camera 182 may be active or passive infrared, color, and/or black and white, and the camera lens may have optics suitable for producing the field of view 184.

The camera system 180 can optically recognize the belt marker 160 and a position of the belt marker 160 (indicated by arrow 186 in FIG. 1 and arrow 188 in FIG. 2) in the field of view 184. The camera system 180 may produce marker position data 190 that is indicative of the position of the belt marker 160.

The occupant constraint system 100 can include a physical characteristic estimator 200. The physical characteristic estimator 200 can be communicatively connected to the camera system 180 to receive the marker position data 190 from the camera system 180. The physical characteristic estimator 200 can use the marker position data 190 to produce a physical characteristic estimate of a physical characteristic of the passenger 106/134. The marker position data 190 can be, or can include, data relating to the location 186/188 of the belt marker 160 in the field of view 184 of the camera 182.

In FIG. 1 passenger 106 shown is approximately in the $50^{th}$ percentile of sizes of people. In this embodiment, the occupant constraint system 100 includes the single sash belt marker 160 on the sash portion 116 of the seat belt 110. The position 182 of the sash belt marker 160 is in the camera field of view 164. In the illustrated example, the sash belt marker 160 is positioned at approximately the middle of the field of view 184. In examples, the camera system 180 may produce the marker position data 190 that indicates that the sash belt marker 160 is approximately the middle of the field of view 184. The physical characteristic estimator 200 can receive the marker position data 190 and may estimate, based on the marker position data 190, the size of the passenger 106. In the example shown in FIG. 1, the physical characteristic estimator 200 may estimate that the size of the passenger is approximately in the $50^{th}$ percentile. In other embodiments, the field of view of the camera and/or the position of the belt marker may be such that when the belt marker is higher or lower in the field of view, the physical characteristic estimator 200 estimates that the passenger is approximately in the $50^{th}$ percentile. In some embodiments, the sash belt marker 160 may be positioned closer to the buckle assembly 128 or closer to the shoulder ring 132 for a passenger that is approximately in the $50^{th}$ percentile.

In FIG. 2, passenger 134 shown is approximately in the $5^{th}$ percentile of sizes of people. The same occupant constraint system 100 is shown in FIG. 2 as is shown in FIG. 1. The occupant constraint system 100 has the single sash belt marker 160 on the sash portion 116 of the seat belt 110. The length of lap portion 112 adjusts to accommodate the relatively smaller waist size of the passenger 134 and slack in the seat belt 110 is taken up by the belt reel 130 which moves the sash belt marker 160 relatively upward, as shown by position 188. As shown in FIG. 1, when the passenger 106 is relatively larger, the sash belt marker 160 is not moved up as far as shown in FIG. 2 since more belt length is required to extend around the waist and torso of the larger passenger 106. In contrast as shown in FIG. 2, when the passenger 134 is relatively smaller, the sash belt marker 160 is moved up further since less belt length is required to extend around the waist and torso of the smaller passenger 134.

In examples, the physical characteristic estimator 200 may estimate a volume of the passenger as the percentile size of the passenger. The volume of the passenger may relate to the waist size and height of the passenger. The physical characteristic estimator 200 may use the estimated volume to determine an estimated mass of the passenger as the physical characteristic. In FIG. 1, the volume of passenger 106 can be estimated at the $50^{th}$ percentile by volume and the physical characteristic estimator 200 can estimate that the mass of passenger 106 based at least in part on the estimated volume of passenger 106.

The physical characteristic estimator 200 may utilize machine learning in which a model is generated to estimate the physical characteristic of the passenger based on inputs of passengers with known physical characteristics. In examples, calibration of the occupant constraint system 100 or generating the model may include having various size people sit in the seat, measuring the position of one or more of the markers, and associating the marker position with the size of the people. In examples, calibration or generating the model may involve using dummies instead of people or may use data available about the size percentiles of a given population. The machine learning model may be validated by comparing results of the physical characteristic estimator 200 with test passengers having known physical characteristics. The calibration or generating the model may need to be done once for a particular configuration of vehicle and/or belt marker layout or may be done more than once which may increase accuracy, for example.

FIGS. 3 and 4 show examples in which there are the series of belt markers 162, 164, 168, 170 and 172 on the seat belt 174. FIG. 3 shows the seat belt 174 as it may be positioned around a relatively larger passenger, and FIG. 4 shows the seat belt 174 as it may be positioned around a relatively smaller passenger. As shown in FIG. 3, lap portion 112 and sash portion 116 of the seat belt 174 is extended further than the lap portion 112 and sash portion 116 of the seat belt 174 shown in FIG. 4. Since the first end 120 of the seat belt 174 is fixed to the chassis 122, then there is an extra length of seat belt 174 that is required to go around the waist of the relatively larger passenger, (FIG. 3). The seat belt 174 is fixed to the chassis 122 by the fixed belt connector 124 at the first mounting position 126. As can be seen by comparing FIG. 3 and FIG. 4, the position of the belt markers 162, 164, 168, 170 and 172 move depending on the size of the passenger. The extra length of seat belt 110 that is required to go around the waist of the relatively larger passenger, (FIG. 3), comes from the belt reel 130. When the passenger has a relatively smaller waist (FIG. 4) the belt reel 130 takes up the slack by winding some of the seat belt 110 into the belt reel 130.

As shown in FIGS. 3 and 4, the physical characteristic estimator 200 may use the location of more than one of the belt markers 162, 164, 168, 170 and 172 to estimate the physical characteristic of the passenger. The belt markers 162, 164, 168, 170 and 172 can be in the camera field of view 184, and the positions of belt marker 164, as illustrated by dashed line 202 in FIG. 3 and dashed line 204 in FIG. 4, and belt marker 172, as illustrated by dashed line 206 in FIG. 3 and dashed line 208 in FIG. 4, can be optically collected by the camera system 180. The camera system 160 may produce marker position data 210 that indicates the locations of belt markers 164 and 172. The physical characteristic estimator 200 can receive the marker position data 210 and may estimate, based on the marker position data 210, the size of the passenger seated in the seat 108. In examples, one of the belt markers can be located on the lap portion 112 of the seat belt 174 and another belt marker can be located on the sash portion 116 of the seat belt 174. In examples, the physical characteristic estimator 200 may use a ratio of the positions of the sash marker (belt marker 172) and the lap marker (belt marker 164). The ratio of the positions of the lap marker and belt marker may indicate the relative size of the passenger's waist and height measurements. The size of the passenger's waist and height may be used to determine an estimated volume of the passenger which may be used to estimate the mass of the passenger.

In examples, the lap portion 112 can include multiple markers having a known spacing and a measure of the passenger's waist may be determined based on how much length of the belt is being used. In examples, the sash portion 116 can include multiple markers having a known spacing and a measure of the passenger's torso may be determined based on how much length of the belt is being used.

As shown in FIG. 5, a seat belt 210 may be manufactured with the belt markers 212, 214, 216, 218, 220, 222, 224 starting at a first end 226 of the seat belt 210 and then continuing in a series for a length indicated by arrow 228. In examples, the seat belt 210 may include a special belt marker 230 which has a different shape, size or other characteristic from other belt markers on the seat belt 210. The special belt marker 230 may be easier to optically identify with the camera system 180 and when installed in the vehicle may fall in the sash portion of the seat belt for passengers that are between the $0^{th}$ and $95^{th}$ percentile of people sizes. Having the belt markers 212, 214, 216, 218, 220, 222, 224 starting from the first end 226 or being a fixed distance from the first end 226 can be useful when calibrating the occupant constraint system 100 for different sized passengers since the belt markers 212, 214, 216, 218, 220, 222, 224 will be at the same distance from the end for every occupant constraint system 100. Belt markers 212, 214, 216, 218, 220, 222, 224 on seat belt 210 include unique identifiers associated with each belt marker. The unique identifiers may be indicative of a distance from the end of the seat belt, and the marker position data may include data related to one or more of the unique identifiers. In examples, the physical characteristic estimate of the physical characteristic of the passenger is generated using a distance from the end of the seat belt determined using one or more unique identifiers.

As shown in FIG. 6, a seat belt 240 can be manufactured from a length of webbing with a continuous series of belt markers 242. In examples, the seat belt for each seat can be cut to the length needed, in which case the seat markers for one seat belt may not be at the same spacing from an end 246 of the seat belt as other seat belts. As shown in FIG. 6, this may result in an offset distance, indicated by arrow 244, which will need to be accounted for when calibrating the occupant constraint system for different sized passengers. In examples, calibration of the seat belt 240 can include adding the offset distance to the length shown by arrow 228 in FIG. 5.

The physical characteristic estimator 200 may estimate the physical characteristic to estimate if the passenger is a large person, e.g., a person who is around the 95$^{th}$ percentile or greater of the size of people; an small person, e.g., a person who is around the 5$^{th}$ percentile or below of the size of people; or an average person, e.g., a person who is around the 50$^{th}$ percentile or between the 5$^{th}$ and 95$^{th}$ percentile of the size of people in the population. In examples, the physical characteristic estimate generated is that the person is below a low percentile of size of people when the height of the sash marker is above a threshold height. In examples, the height of the sash marker can relate to a distance of the marker from the buckle. In examples, height of the sash marker can be indicative of the volume of the passenger using the seat belt, with higher sash marker positions indicative of smaller volume and lower sash marker positions indicative of larger volume. In examples, the physical characteristic estimate generated is that the person is above a high percentile of size of people when the height of the sash marker is below a threshold height.

A volume of an occupant can be estimated at one or more discrete locations, for example. A lap portion of a belt can be used to estimate a circumference of a user. As disclosed herein, various sensors and/or methodologies can be used to estimate a length of a lap portion of a seatbelt. The lap portion can be modeled as a curve over a waste of an occupant. The length of the curve can be used to estimate the are underneath. For example, the curve can be modeled in the form of y=√(H−(½ *L)$^2$) wherein H=the peak height of the curve (e.g., the distance that the belt protrudes outward) and L=the length of the curve. The peak height can be measured directly (e.g., by using a depth measuring camera) or can be estimated (e.g., based on an average ratio of a person's belly width vs height). Integrating the formula can provide the following formula for area under the curve:

$$H * \arcsin\left(\frac{L}{2\sqrt{H}}\right) + \frac{L\sqrt{H} - \frac{L^2}{4}}{2} + C,$$

wherein C is an offset that may be disregarded. Note that this is one example formula that can be used and an additional component may be added based on the area of a person's torso not under the curve (e.g., behind the buckle). The area can be used to infer mass and/or size of the occupant.

In some examples, the formula may be modified depending on the position of the lap portion on a user's torso (e.g., depending on its height above the seat as a larger individual may wear the lap portion higher on their torso). The formula may also be modified depending on the length as a larger person may have a more rounded torso than a smaller person. As further disclosed herein, a similar methodology can be applied to the sash portion of the seatbelt to estimate an area under the sash portion of a seat belt. In some examples, a ration between a length or position of a portion of a sash portion or a lap portion of a seatbelt can be used to modify the above equation (e.g., for a person with a smaller waste and larger chest). In some examples, an occupant's size and/or weight can be estimated without direct calculation and may be inferred from a length of one or more portions of a seatbelt and/or positions of portions of the seatbelt by, for example, using machine learning or a lookup table based on statistical averages.

The physical characteristic estimator 200 may estimate different sizes, which can include the passenger height, weight or combination of height and weight. In some examples, the physical characteristic estimator 200 may estimate the passenger shape which can include the build, such as whether the person carries their weight relatively higher up on their torso, or carries their weight lower or around the waist, or is thin. In some examples, the physical characteristic estimator 200 may estimate the height of the passenger as the physical characteristic. Since a relatively taller person typically has a higher center of mass than a relatively shorter person, the force generated on a sash portion of the belt going across the torso of the passenger may be greater for a taller person than for a shorter person of the same weight. In some examples, the physical characteristic estimator 200 can estimate a ratio of the height and waist of the passenger as the physical characteristic. The ratio can be indicative of the volume of the passenger and the ratio can be indicative of the weight and center of mass of the passenger. These estimates of the physical characteristic can then be used for adjusting a safety system or other passenger related system in the vehicle.

The occupant constraint system 100 can include a passenger related system 250 (FIG. 9) that can have a passenger function related to the passenger's physical benefit. The passenger related system 250 can control the passenger function based at least in part on the physical characteristic estimate. The passenger related system 250 may be communicatively connected to the physical characteristic estimator 200 to receive the physical characteristic estimate data; or may be connected through the vehicle system 152 for controlling the passenger function. The passenger related system 250 may be, for example a load limiter 252, (FIGS. 1-4), that is connected to the belt reel 130. In this example, the passenger function may be a holding force at which the belt reel 130 holds the seat belt 110/174 from unwinding from the belt reel 130 during a collision involving the vehicle 104.

The load limiter 252 can allow the seat belt 110/174 to extend from the belt reel 130 at a controlled rate during a collision rather than having the belt reel 130 simply holding the seat belt rigidly without any give. The occupant constraint system 100 can adjust the holding force of the load limiter 252 dependent on the physical characteristic of a passenger in a given seat 108. In an example, the occupant constraint system 100 may provide a lower holding force for relatively smaller passengers and provide a higher holding force for relatively larger passengers. The occupant constraint system 100 may provide a greater holding force for a taller person and a lesser holding force for a shorter person. In examples, the occupant constraint system may provide a lower holding force for a passenger in the lower percentile, such as 5$^{th}$ percentile, than a holding force for a passenger in the higher percentile, such as 50$^{th}$ or 95$^{th}$ percentile.

In examples, the holding force can be reduced before or at a beginning of the collision when the physical characteristic estimate generated is that the passenger is at or below the fifth percentile of size of people. In examples, the holding force can be maintaining during the collision when the physical characteristic estimate generated is that the passenger is at or above the 95$^{th}$ percentile of size of people. In examples, the holding force can be reduced after the beginning of the collision if the physical characteristic estimate generated is that the passenger is above the fifth percentile of size of people and below the 95 the percentile of size of people.

Figure 7:
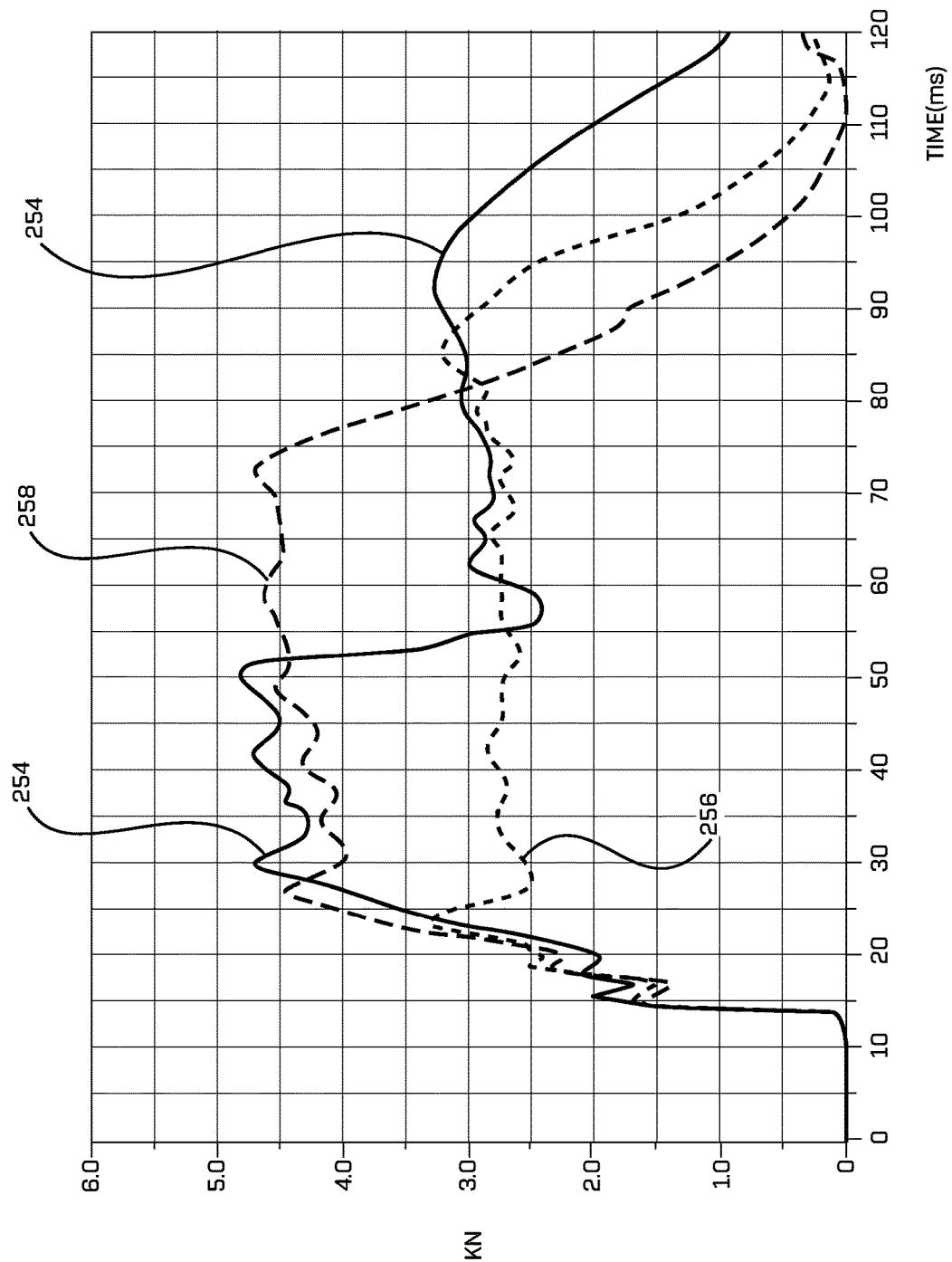
FIG. 7 is a graph illustrating holding forces of a load limiter of examples of an occupant constraint system.

FIG. 7 is a graph 248 of holding force examples of passenger functions in kilo-Newtons (kN) that can be provided by the load limiter 252 during a collision of the vehicle

104 that starts between approximately 0 mS to approximately 30 milliseconds (mS) and ends between approximately 73 mS and 120 mS. In some examples, a holding force 254 of the load limiter 252 can be set to a relatively higher holding force of approximately 4.5 kN and can then be reduced to a holding force of approximately 3.0 kN during a collision if the mass or size of the passenger is estimated to be below a certain threshold mass or size, and/or above a certain threshold mass or size. In examples, a holding force 256 of the load limiter can be controlled to provide a relatively smaller holding force of approximately 3.0 kN if the physical characteristic estimate generated is that the passenger is at or below the fifth percentile of size of people. In examples, a holding force 258 can be controlled to provide a relatively larger holding force of approximately 4.5 kN during the entire collision event if the physical characteristic estimate generated is that the passenger is at or above the 95th percentile of size of people.

In some examples, the vehicle may include a collision detector (not shown) which may determine when a collision even has begun and has ended. The collision detector can be part of the vehicle system 152. In some embodiments, the holding force can be controlled to provide a relatively larger holding force during part of the collision and a relatively smaller holding force during another part of the collision. The holding force may be set ahead of the collision and maintained at the set force or the holding force may be adjusted during the collision. By controlling the holding force based on the size of the passenger, the occupant constraint system may reduce injury to the passenger caused by the belt while still retaining the safety benefits of the seat belt.

In some examples, the belt reel 130 may include a motor 260, as shown in FIGS. 3 and 4. The motor 260 may tighten the seat belt 174 around the passenger so that the seat belt is snug against the passenger. By fitting the seat belt 174 snug against the passenger, in the event of a vehicle collision the seat belt 174 can act to control the movement of the passenger without the passenger first moving to take up the slack in the seat belt. In some examples, the motor 260 may be used as the load limiter or may assist in controlling the holding force of the belt. In some examples, the belt reel 130 may include a seat belt tension sensor that can determine an amount of force applied by the motor and/or by the load limiter. The tension sensor may be used to make sure that the force applied to the seat belt 174 by the belt reel 130 does not exceed a desired level. For example, if the motor 260 is applying a force to the seat belt 174 to make the belt snug, then the tension sensor can be used to make sure the force does not exceed a level appropriate for that purpose. In another example, if the vehicle is in an accident, the tension sensor may be used to make sure that the holding force is appropriate to keep the passenger safe based on the estimated physical characteristic of the passenger. In examples, the tension sensor may be used in estimating a mass of the passenger by determining a holding force needed to hold the passenger against the seat during routine stops or starts of the vehicle.

In another example, the passenger related system 250 may be an air bag system 266 (FIGS. 1 and 2) and the passenger function may be a deployment rate, volume and/or pressure at which the an airbag of the airbag system 266 deploys during a collision of the vehicle. The physical characteristic estimator 200 may operate with the airbag system 266 to deploy an airbag at a different deployment rate, volume, and/or pressure depending on the estimated physical characteristic of the passenger 106/134. For example, if the passenger is small, such as passenger 134 in FIG. 2, then the airbag system 266 may deploy an airbag at a relatively slower rate, with less volume, and/or with lower pressure then if the passenger is large or average, such as passenger 106 shown in FIG. 1.

In some examples, the estimated physical characteristic of the passenger can be used to control other types of passenger related systems in the vehicle 104, such as heating and air-conditioning systems which may be part of vehicle system 152. In examples, the estimated physical characteristic may be used to determine the how much heat or air-conditioning is required to warm or cool the passenger compartment 102 of the vehicle. The heat or air-conditioning requirements may be related to the sizes of one or more passengers in the passenger compartment 102. In examples, the passenger related system vehicle system controlled can be related to the suspension of the vehicle.

In examples, the occupant constraint system 100 can include or operate with a seat sensor. The seat sensor may be part of vehicle system 152 and may provide a weight related to a person or object sitting on the seat 108. The seat sensor may be used to determine if a passenger is seated in the seat 108 or if the seat is empty or has an object on it. In examples, the seat sensor may be used to determine that the seat is empty and the occupant constraint system 100 does not need to estimate a physical characteristic of a passenger, when the seat sensor determines a weight on the seat to be less than 3 kilograms. In examples, the seat sensor may be used to determine that the seat has a small person or an object if the seat sensor determines a weight on the seat to be between about 3 and 23.4 kilograms. In examples, the seat sensor may be used to determine that the seat has a passenger and the occupant constraint system 100 should operate if the seat sensor determines a weight of 23.4 kilograms or greater.

In examples, the vehicle may include an active seat back and/or an active head rest that can be part of vehicle system 152 and which may be used in estimating the size or stature of the passenger. In examples, the position of the passenger's head in relation to the seat back may be optically determined. In some examples the seat back and/or head rest may be adjusted or articulated based on the estimated size of the passenger to prepare for an impending collision.

Figure 8:
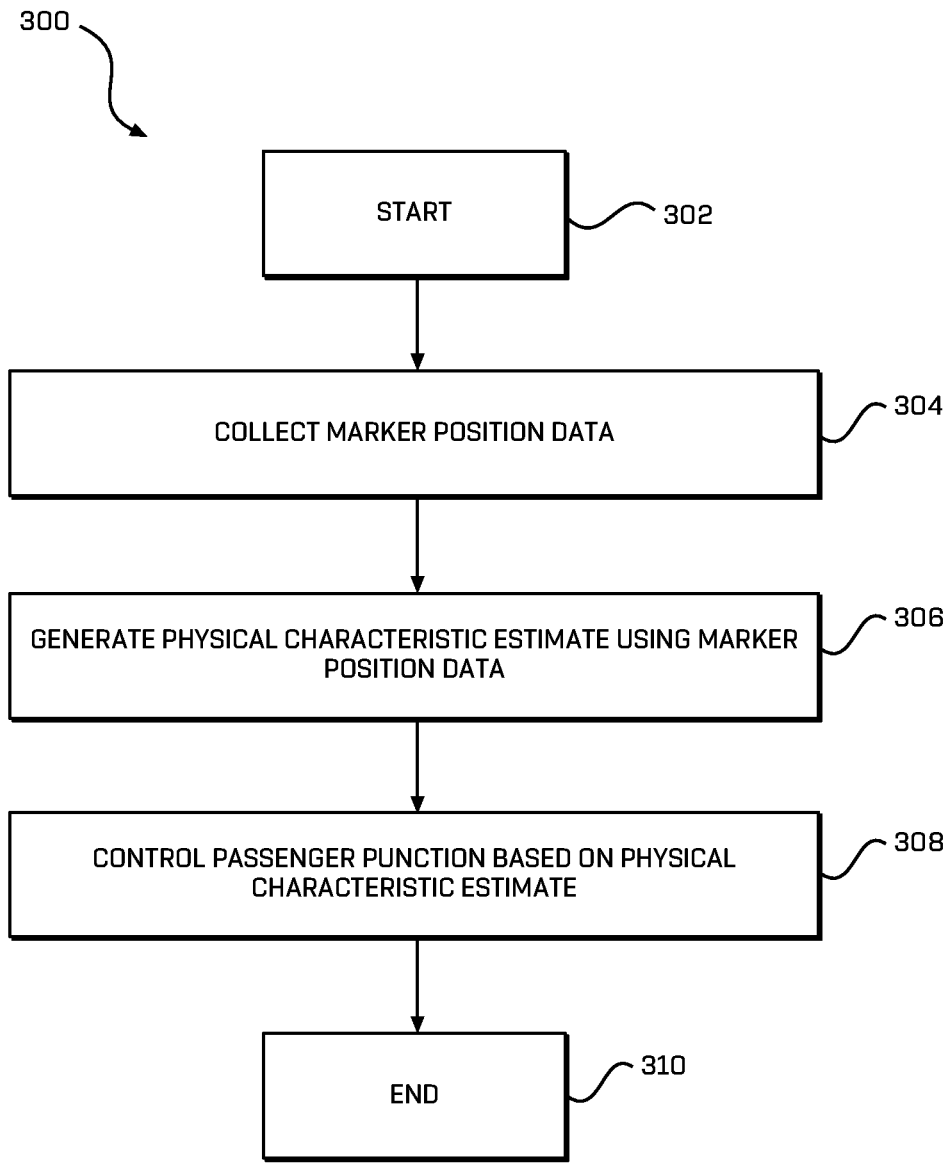
FIG. 8 is a flow diagram of a process.

FIG. 8 is a flow diagram of an example process 300 which begins at a start 302. Process 300 then proceeds to 304 where marker position data is collected, e.g., optically. The marker position data is related to a position of a belt marker on a seat belt in a vehicle while a passenger is seated in the vehicle with a lap portion of the belt across the passenger's lap and a sash portion of the belt across the passenger's torso. Process 300 the proceeds to 306 where a physical characteristic estimate of a physical characteristic of the passenger is generated a using the marker position data. Process 300 then proceeds to 308 where a passenger function of a passenger related system is controlled based on the physical characteristic estimate. Process 300 then proceeds to 310 where the process ends.

Figure 9:
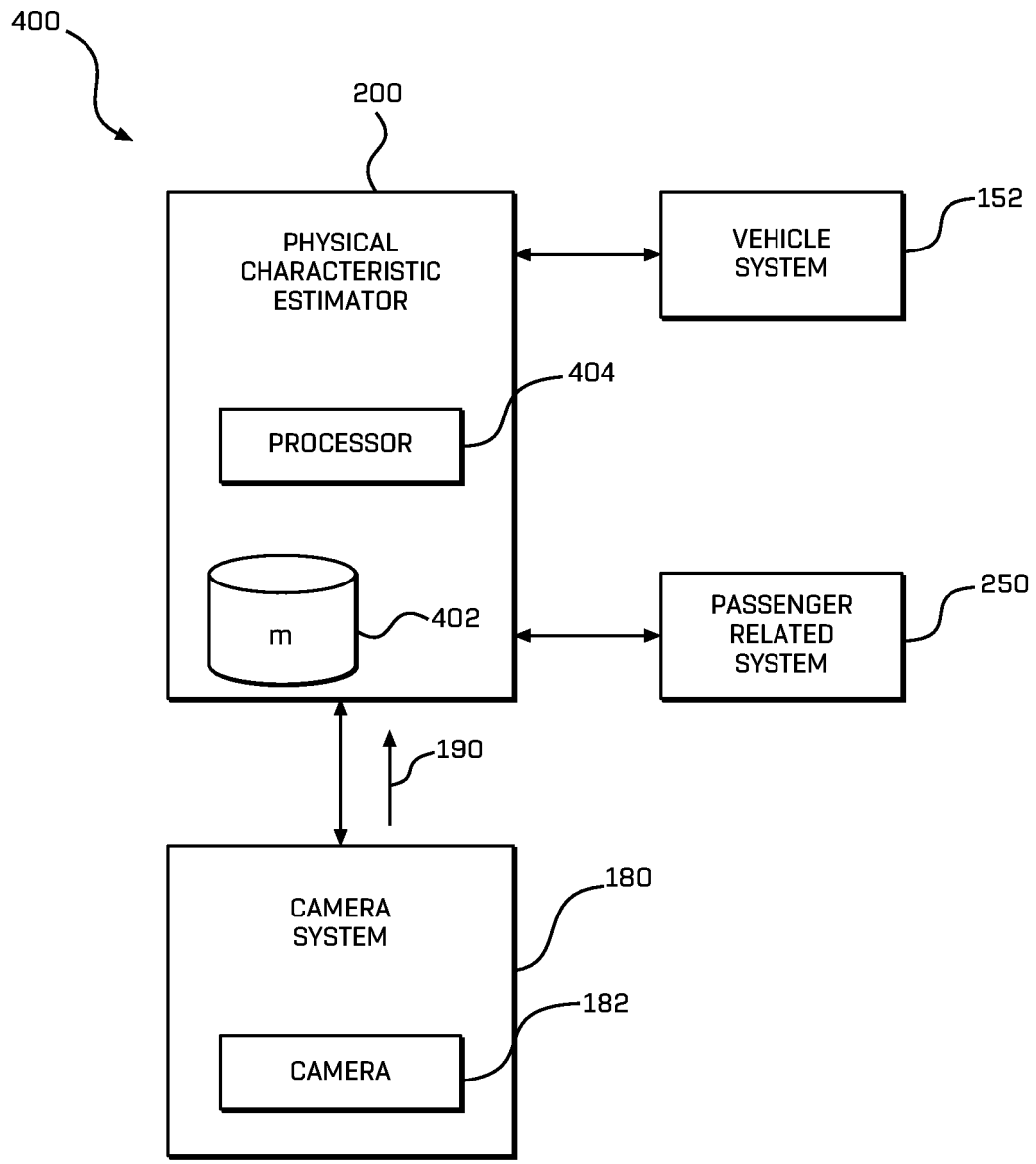
FIG. 9 is a block diagram of components of examples of an occupant constraint system.

FIG. 9 is a block diagram 400 of certain components of the occupant constraint system 100. The occupant constraint system 100 can include the camera system 180 having the camera 182. The occupant constraint system 100 can include the physical characteristic estimator 200 which can be connected directly or indirectly to the camera system 180 to receive marker position data 190 from the camera system 180. The camera system 180 may take image information from the camera 182, such as an array of pixels or other image information produced by the camera 182 and may format the image information for transmission as a signal to the physical characteristic estimator 200 including marker position data that is contained in the image information. The physical characteristic estimator 200 may receive a signal having the marker position data from the camera system 180 and may process the signal to extract the marker position data 190. The physical characteristic estimator 200 may use the extracted marker position data to estimate one or more physical characteristics of a passenger. In one example, the physical characteristic estimator 200 may have calibration data that is stored in a memory 402 in the physical characteristic estimator 200. The calibration data may include information related to positions of one or belt marker that correspond to physical characteristics of passengers. The calibration data may be a result of calibration of the occupant constraint system 100. The physical characteristic estimator may use a processor 404 to compare the marker position data 190 received from the camera system 180 to the calibration data to formulate an estimated physical characteristic of a physical characteristic of the passenger.

The physical characteristic estimator 200 may send the physical characteristic estimate to the passenger related system for control of the passenger function. In this embodiment, the passenger related system may include a processing system to interpret the physical characteristic estimate into a control for the passenger function. In examples, the physical characteristic estimator 200 may provide control instructions based on the physical characteristic estimate to the passenger related system for control of the passenger function. In examples, the occupant constraint system can communicate and cooperate with one or more vehicle system 152. The vehicle system may include a buckle sensor, collision detector, location system, vehicle controller, seat belt tension sensor, and/or other systems.

The processor may include one or more processors. The processor may be any suitable processor that is capable of executing instructions. The processor may be an instruction set architecture (ISA), such as x86, PowerPC, SPARC, or MIPS, or other suitable ISA processor. In examples the camera system and/or the physical characteristic estimator 180 may include a central processing unit (CPU), a graphics processing unit (GPU) or both. Memory 402 may be non-transitory computer readable media that stores executable instructions which when performed by the processor perform the processes described herein including the process as described in FIG. 8. The non-transitory computer readable media may be solid state memory, magnetic or optical media or other media for storing instructions that is non-volatile.

The occupant constraint system 100 can be used for multiple passenger seated in different seats and using different seat belts. The occupant constraint system 100 can individually distinguish the sizes of the different passengers. The occupant constraint system 100 can use a single camera to optically collect marker position data related to one or more seat belts in the passenger compartment or may use multiple cameras. In examples, the camera can include a fish-eye lens and can have a one hundred eighty degree viewing angle.

In some examples, the occupant constraint system 100 may identify if the passenger is leaning forward in their seat by the position of one or more belt marker. In some examples, the occupant constraint system 100 may determine that the passenger is leaning forward in their seat by detecting a position of one or more belt markers on the seat belt which may be closer to the camera and therefore larger than if the passenger is leaning back against the seat back. In some examples, the occupant constraint system 100 may determine that the passenger is leaning forward by comparing positions of the belt marker over time. In some examples, the occupant constraint system 100 may determine that the passenger is leaning forward based on a length of seat belt that is unwound from a belt reel in comparison to a length of seat belt unwound from the belt reel when the passenger is seated upright and leaning back against the back of the seat. In some examples, the size or shape of a seat belt marker may change when the passenger is leaning forward since the belt marker may be viewed by a camera of a camera system at a different angle than before the passenger leaned forward. In some examples, the passenger leaning forward can indicate that the passenger is unhealthy or is experiencing a medical emergency. The occupant constraint system 100 may attempt to ascertain if the passenger needs assistance audibly, visually and/or haptically by vibrating the seat or belt or the vehicle in some other way.

Figure 10:
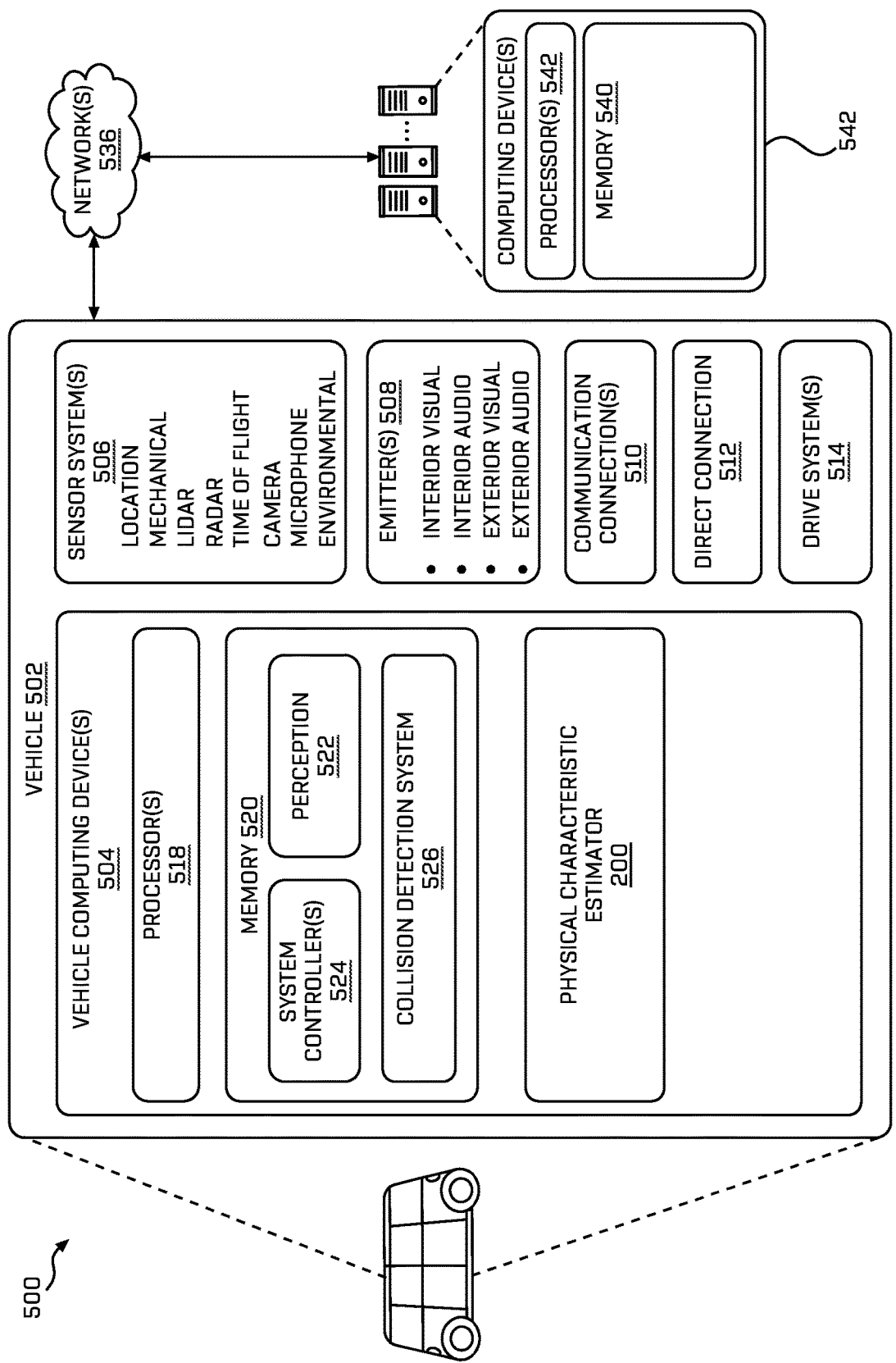
FIG. 10 depicts a block diagram of an example system for implementing the techniques described herein.

FIG. 10 depicts a block diagram of an example system 500 for implementing the techniques described herein. In some instances, the system 500 may include a vehicle 502, which may correspond to the vehicle 104 of FIGS. 1-4. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification. Moreover, in some instances, the techniques described herein may be usable by non-autonomous vehicles as well.

The vehicle 502 can include vehicle computing device(s) 504, one or more sensor systems 506, one or more emitters 508, one or more communication connections 510, at least one direct connection 512 (e.g., for physically coupling the vehicle 502 to exchange data and/or to provide power), and one or more drive systems 514.

In some instances, the sensor(s) 506 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 506 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504.

The vehicle 502 may also include the emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include the communication connection(s) 510 that enable communication between the vehicle 502 and one or more other local or remote computing device(s). For instance, the communication connection (s) 510 may facilitate communication with other local computing device(s) on the vehicle 502 and/or the drive system (s) 514. Also, the communication connection(s) 510 may additionally or alternatively allow the vehicle 502 to communicate with other nearby computing device(s) (e.g., other nearby vehicles, traffic signals, etc.). The communication connection(s) 510 may additionally or alternatively enable the vehicle 502 to communicate with computing device(s) 504.

The vehicle computing device(s) 504 can include one or more processors 518 and memory 520 communicatively coupled with the one or more processors 518. In the illustrated example, the memory 520 of the vehicle computing device(s) 504 stores a perception component 522, one or more system controllers 524, and a collision detection system 526. Though depicted in FIG. 10 as residing in memory 520 for illustrative purposes, it is contemplated that the perception component 522, the one or more system controllers 524, and the collision detection system 526 may additionally, or alternatively, be accessible to the vehicle 502 (e.g., stored remotely).

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device(s) 504 can include one or more system controllers 524, which can be configured to control steering, propulsion, braking, safety, emitters, communication, and other systems of the vehicle 502. The system controller(s) 524 can communicate with and/or control corresponding systems of the drive system(s) 514 and/or other components of the vehicle 502.

The system controller(s) 524 may be communicatively coupled to one or more sensors of the vehicle sensor system(s) 506. By way of non-limiting example, the sensors may detect the presence of objects in the environment of the vehicle and/or determine attributes of those objects. The system controller(s) 524 may also cause activation of a safety system of the vehicle 502 when it is determined that the safety system should be activated. For example, the system controller 524 may instruct an airbag control unit to deploy one or more airbags, or may send a signal to a tensioner arranged to adjust tensioning of one or more restraints. Other safety systems are known and may be activated. In other embodiments, the system controller 524 may instruct activation of multiple safety systems. In some embodiments, some or all functionality of the safety system controller 524 may be performed remote from the vehicle 502, e.g., at a remote server associated with a dispatch or headquarters for the vehicle 502 or in the cloud. In other implementations, some or all of the functionality of the system controller(s) 524 may be performed at the vehicle 502 to minimize any delay that could result from the transmission of data between locales.

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

The collision detection system 526 is configured to detect relatively higher impact collisions using inputs from one or more sensors of the sensor system(s) 506. For example, inputs from accelerometers placed proximate the front of the vehicle may indicate a head-on collision with an object. A collision indication from the collision detection system 526 causes the system controller(s) 524 to deploy vehicle safety systems, for example, one or more airbags, air curtains, restraint systems, or the like.

In response to a collision event indication from the collision detection system 526, the system controller(s) 524 may take one or more of the following actions, as non-limiting examples. The system controller(s) 524 may engage the drive system(s) 514 to bring the vehicle 502 to a stop. The system controller(s) 524 may open a communication connection(s) 510 between a communication unit of the vehicle 502 and a tele-operator over a network 536. This connection may enable a two-way communication between the tele-operator and person(s) located in and around the vehicle 502. The system controller(s) 524 may also store vehicle operational data such as vehicle speed, heading, steering angle, as well as data from sensor system(s) 506 for an interval of time preceding and subsequent to the collision event. The operational data may be stored locally in the on-board memory 520 of the vehicle 502, or may be transmitted via network(s) 536 to an external computing device(s) 538 to be stored in external memory 540. The external computing device(s) 538 may include one or more processor 542. The system controller(s) 524 may also engage the emitter(s) 508 on vehicle 502 to indicate a hazard condition when an impact collision indication is received. For example, an audio emitter may sound the horn, or make an announcement in the interior of the vehicle 502. A visual emitter such as hazard lights on the exterior of the vehicle 502 may also be activated. The lighting in the interior of the vehicle 502 may also indicate an impact event.

In examples, the physical characteristic estimator 200 may be incorporated into vehicle computing device(s) 504. The processor 404 may correspond to the processor(s) 518 and the memory 402 may correspond to memory 402. In examples, the camera 182 of the camera system 180 may correspond to one or more camera in the sensor system(s) 506. In examples, the vehicle system 152 may include or be controlled by the system controller(s) 524. For example, the system controller 524 may control the deployment of one or more airbags 266 or may send a signal to the load limiter 266.

In some examples, the vehicle 502 can send operational data, including raw or processed sensor data from the sensor system(s) 506, to one or more computing device(s) 538 via the network(s) 536. The operational data can be sent in response to a collision event detected by the collision detection system 526. In other examples, the vehicle 502 can send processed operational data and/or representations of operational data to the computing device(s) 538 at a particular frequency, after a lapse of a predetermined period of time, in near real-time, etc. In some cases, the vehicle 502 can send raw or processed operational data to the computing device(s) 538 as one or more log files.

In some instances, aspects of some or all of the components discussed herein may include any models, algorithms, and/or machine learning algorithms. For example, the component(s) in the memory 520, 540 may be implemented as a neural network. As can be understood in the context of this disclosure, a neural network can utilize machine learning, which can refer to a broad class of such algorithms in which an output is generated based on learned parameters.

In examples, the vehicle 104 illustrated in FIG. 1 can be a bidirectional, autonomous vehicle, and can therefore be configured to transport passengers autonomously between pick-up locations, where one or more passengers may enter the vehicle, and destination locations, where one or more passengers may exit the vehicle. As will be appreciated, each passenger in the vehicle 104 may have a different pick-up and/or destination location. Vehicles such as the vehicle shown in FIG. 1 may be used as robotic taxis, enabling multiple passengers to occupy the interior volume at a time for transportation between their pick-up and destination locations. A passenger may submit a booking via a remote server or directly to the vehicle to request the vehicle to drive to a pick-up location to pick the passenger up and to transport the passenger to a destination location.

EXAMPLE CLAUSES

A: An occupant constraint system, comprising:
a belt, including a first belt end and a second belt end;
a belt connector that connects the first belt end to a vehicle at a first mounting position relative to a seat in the vehicle;
a buckle assembly comprising a belt portion and a vehicle portion, the vehicle portion fixed to the vehicle at a second mounting position relative to the seat;
a shoulder ring connected to the vehicle at a third mounting position, the shoulder ring including a slot through which the belt passes;
a belt reel connected to the vehicle at a fourth mounting position and connected to the second belt end to wind and unwind a portion of the belt adjacent to the second belt end,
wherein the belt includes a lap portion between the first belt end and the belt portion of the buckle assembly for extending across the waist of a passenger, and includes a sash portion between the belt portion of the buckle assembly and the shoulder ring for extending across a torso of the passenger;
a sash marker on the sash portion of the belt;
a camera system having a camera with a field of view that includes a view of the sash marker, when the passenger is seated between the sash portion and the seat, and wherein the camera system produces marker position data indicative of a position of the sash marker;
a physical characteristic estimator that is communicatively coupled to the camera system, wherein the physical characteristic estimator is configured to receive the marker position data from the camera system and to produce, based at least in part on the marker position data, a physical characteristic estimate of a physical characteristic of the passenger; and
a passenger related system having a passenger function, the passenger related system controlling the passenger function based at least in part on the physical characteristic estimate.

B: The occupant constraint system of clause A, wherein the passenger related system is a load limiter connected to the belt reel and the passenger function is a holding force at which the belt reel holds the belt from unwinding from the belt reel during a collision of the vehicle.

C: The occupant constraint system of clause A, wherein the passenger related system is an airbag system and the passenger function is a deployment rate, volume and/or pressure at which the an airbag of the airbag system deploys during a collision of the vehicle.

D: The occupant constraint system of clause A, further comprising a lap marker on the lap portion of the belt, and wherein the field of view of the camera includes a view of the lap marker, when the passenger is seated in the vehicle and is between the lap portion and the seat with the buckle assembly buckled, and wherein the marker position data is indicative of the position of the sash marker and the position of the lap marker.

E: The occupant constraint system of clause D, wherein the lap marker and the sash marker are each one of a series of belt markers on the belt.

F: A method comprising:
determining a position of a belt marker, as marker position data, wherein the belt marker is included on a seat belt configured to secure a passenger to a vehicle seat and the seat belt includes a lap portion and a sash portion;
generating, based at least in part on the marker position data, a physical characteristic estimate of a physical characteristic of the passenger; and
controlling a passenger function of a passenger related system based at least in part on the physical characteristic estimate.

G: The method of clause F, wherein the passenger related system includes a belt reel with a load limiter and the passenger function is a holding force at which the belt reel holds the belt from unwinding from the belt reel during a collision of the vehicle.

H: The method of clause F, wherein the passenger related system is an airbag system and the passenger function is a deployment rate, volume and/or pressure at which the an airbag of the airbag system deploys during a collision of the vehicle.

I: The method of clause F, wherein the belt marker is a sash marker on the sash portion of the belt and wherein the marker position data optically collected includes data related to a height of the sash marker on the passenger's torso.

J: The method of claim 9, wherein the physical characteristic estimate generated is that the passenger is below a low percentile of size of people when the height of the sash marker is above a threshold height.

K: The method of clause J, wherein the physical characteristic estimate generated is that the passenger is above a high percentile of size of people when the height of the sash marker is below a threshold height.

L: The method of clause J, wherein the passenger related system is a load limiter connected to a belt reel of the seat belt and the passenger function is a holding force at which the belt reel holds the seat belt from unwinding from the belt reel during a collision of the vehicle, and wherein controlling the passenger function includes: reducing the holding force before or during the collision when the physical characteristic estimate generated is that the passenger is at or below the fifth percentile of mass of people; maintaining the holding force during the collision when the physical characteristic estimate generated is that the passenger is at or above the $95^{th}$ percentile of mass of people; and reducing the holding force after the beginning of the collision if the physical characteristic estimate generated is that the passenger is above the fifth percentile of mass of people and below the 95 the percentile of mass of people.

M: The method of clause F, wherein the position of the belt marker is determined optically.

N: The method of clause F, wherein the belt marker includes a sash marker on the sash portion of the belt and a lap marker on the lap portion of the belt, and wherein the marker position data collected includes data related to positions of the sash marker and the lap marker, and the physical characteristic estimate is generated using a ratio of the positions of the sash marker and the lap marker.

O: The method of clause N, wherein sash marker and the lap marker are each one of a series of belt markers on the seat belt that begin at an end of the seat belt that is connected to the vehicle, each of the belt markers including a unique identifier, and wherein collecting marker position data includes collecting data related to one of the unique identifiers.

P: The method of clause O, wherein the unique identifiers are indicative of a distance from the end of the seat belt, and wherein generating a physical characteristic estimate of a physical characteristic of the passenger includes using the distance from the end of the seat belt.

Q: The method of clause P, wherein a first one of the series of belt markers is offset by an offset distance from the end of the seat belt, and wherein generating a physical characteristic estimate includes using the distance from the end of the seat belt and the offset distance.

R: The method of clause F, wherein the belt marker is an infrared reflector, and the marker position data is collected using an infrared sensor.

S: A vehicle comprising:
a seat belt including a lap portion and a sash portion;
a belt marker positioned on the seat belt;
a camera system having a camera mounted in a passenger compartment of the vehicle, the camera having a field of view that includes a view of the belt marker, the camera system producing marker position data indicative of the position of the belt marker;
a physical characteristic estimator that is communicatively coupled to the camera system, wherein the physical characteristic estimator is configured to receive the marker position data from the camera system and to produce, based at least in part on the marker position data, a physical characteristic estimate of a physical characteristic of a passenger using the seat belt; and
a passenger related system having a passenger function, the passenger related system controlling the passenger function based at least in part on the physical characteristic estimate.

T: The vehicle of clause S, wherein the camera includes an infrared capacity, and wherein the belt marker includes a series of infrared reflective individual markers that extend from an end of the seat belt along the lap portion of the seat belt and to the sash portion of the seat belt, and wherein the camera system infrared-optically recognizes a distance from the seat belt end to one of the belt markers on the sash portion of the seat belt as the position of the belt marker.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:
1. An occupant constraint system, comprising:
belts, including a first belt and a second belt, each belt including a first belt end and a second belt end;
belt connectors that connect the first belt ends to a vehicle at first mounting positions relative to seats in the vehicle;
buckle assemblies, each comprising a belt portion and a vehicle portion, the vehicle portions fixed to the vehicle at second mounting positions relative to the seats;
shoulder rings connected to the vehicle at third mounting positions, each of the shoulder rings including a slot through which a respective belt of the first belt and second belt passes;
belt reels connected to the vehicle at fourth mounting positions and connected to the second belt ends to wind and unwind portions of the first belt and the second belt adjacent to the second belt ends,
wherein each belt includes a lap portion between the first belt end and the belt portion of the buckle assembly for extending across the waist of a passenger, and includes a sash portion between the belt portion of the buckle assembly and the shoulder ring for extending across a torso of the passenger;
a sash marker on the sash portion of each belt and a lap marker on the lap portion of each belt, wherein the sash marker and the lap marker are each one of a series of belt markers on the seat belt that begin at an end of the seat belt that is connected to the vehicle, wherein a first one of the series of belt markers is offset by an offset distance from the end of the seat belt, and each of the belt markers includes a unique identifier that is indicative of a distance from the end of the seat belt;

a camera system having a fish-eye lens camera with a field of view that includes a view of the sash marker of each belt and a view of the lap marker of each belt, when passengers are seated between the sash portions and the seats, and wherein the camera system produces marker position data indicative of positions of the sash marker and the lap marker of each belt and including data related to one of the unique identifiers;

a physical characteristic estimator that is communicatively coupled to the camera system, wherein the physical characteristic estimator is configured to receive the marker position data from the camera system and to produce, based at least in part on the marker position data including the distance of the marker from the end of the seat belt and the offset distance, physical characteristic estimates of physical characteristics of seated passengers, the physical characteristic estimate generated using a ratio of the positions of the sash marker and the lap marker; and a passenger related system having a passenger function, the passenger related system controlling the passenger function based at least in part on the physical characteristic estimates.

2. The occupant constraint system of claim 1, wherein the passenger related system is a load limiter connected to the belt reels and the passenger function is a holding force at which the belt reels holds the belts from unwinding from the belt reels during a collision of the vehicle.

3. The occupant constraint system of claim 1, wherein the passenger related system is an airbag system and the passenger function is a deployment rate, volume and/or pressure at which an airbag of the airbag system deploys during a collision of the vehicle.

4. A method comprising:

determining a position of a belt marker, as marker position data, wherein the belt marker is included on a seat belt configured to secure a passenger to a vehicle seat and the seat belt includes a lap portion and a sash portion, wherein the belt marker includes a sash marker on the sash portion of the belt and a lap marker on the lap portion of the belt, the sash marker and the lap marker are each one of a series of belt markers on the seat belt that begin at an end of the seat belt that is connected to the vehicle, wherein a first one of the series of belt markers is offset by an offset distance from the end of the seat belt, and each of the belt markers includes a unique identifier that is indicative of a distance from the end of the seat belt, and wherein determining a position of the belt marker includes collecting data related to one of the unique identifiers, and wherein the marker position data includes data related to positions of the sash marker and the lap marker;

generating, based at least in part on the marker position data including the distance of the marker from the end of the seat belt and the offset distance, a physical characteristic estimate of a physical characteristic of the passenger, and wherein the physical characteristic estimate is generated using a ratio of the positions of the sash marker and the lap marker; and controlling a passenger function of a passenger related system based at least in part on the physical characteristic estimate.

5. The method of claim 4, wherein the passenger related system includes a belt reel with a load limiter and the passenger function is a holding force at which the belt reel holds the belt from unwinding from the belt reel during a collision of the vehicle.

6. The method of claim 4, wherein the passenger related system is an airbag system and the passenger function is a deployment rate, volume and/or pressure at which an airbag of the airbag system deploys during a collision of the vehicle.

7. The method of claim 4, wherein the belt marker is a sash marker on the sash portion of the belt and wherein the marker position data optically collected includes data related to a height of the sash marker on the passenger's torso.

8. The method of claim 7, wherein the physical characteristic estimate generated is that the passenger is below a low percentile of size of people when the height of the sash marker is above a threshold height.

9. The method of claim 7, wherein the physical characteristic estimate generated is that the passenger is above a high percentile of size of people when the height of the sash marker is below a threshold height.

10. The method of claim 7, wherein the passenger related system is a load limiter connected to a belt reel of the seat belt and the passenger function is a holding force at which the belt reel holds the seat belt from unwinding from the belt reel during a collision of the vehicle, and wherein controlling the passenger function includes: reducing the holding force before or during the collision when the physical characteristic estimate generated is that the passenger is at or below the fifth percentile of mass of people; maintaining the holding force during the collision when the physical characteristic estimate generated is that the passenger is at or above the $95^{th}$ percentile of mass of people; and reducing the holding force after the beginning of the collision if the physical characteristic estimate generated is that the passenger is above the fifth percentile of mass of people and below the $95^{th}$ percentile of mass of people.

11. The method of claim 4, wherein the position of the belt marker is determined optically.

12. The method of claim 4, wherein the belt marker is an infrared reflector, and the marker position data is collected using an infrared sensor.

13. A vehicle comprising:

seat belts, each including a lap portion and a sash portion;

belt markers positioned on each seat belt, the belt markers on each seat belt comprising a sash marker on the sash portion and a lap marker on the lap portion, wherein the sash marker and the lap marker are each one of a series of belt markers on the seat belt that begin at an end of the seat belt that is connected to the vehicle, wherein a first one of the series of belt markers is offset by an offset distance from the end of the seat belt, and each of the belt markers includes a unique identifier that is indicative of a distance from the end of the seat belt;

a camera system having a fish-eye lens camera mounted in a passenger compartment of the vehicle, the camera having a field of view that includes a view of the belt markers of each seat belt, the camera system producing marker position data indicative of the position of each belt marker and including data related to one of the unique identifiers;

a physical characteristic estimator that is communicatively coupled to the camera system, wherein the physical characteristic estimator is configured to receive the marker position data from the camera system and to produce, based at least in part on the marker position data including the distance of the marker from the end of the seat belt and the offset distance, physical characteristic estimates of physical characteristics of passengers using the seat belts, the physical characteristic estimate generated using a ratio of the positions of the sash marker and the lap marker; and a passenger related system having a passenger function, the passenger related system controlling the passenger function based at least in part on the physical characteristic estimates.

14. The vehicle of claim 13, wherein the camera includes an infrared capacity, and wherein the belt markers include a series of infrared reflective individual markers that extend from an end of the seat belt along the lap portion of the seat belt and to the sash portion of the seat belt, and wherein the camera system infrared-optically recognizes a distance from the seat belt end to one of the belt markers on the sash portion of the seat belt as the position of the belt marker.

* * * * *